(12) United States Patent
Steinkemper et al.

(10) Patent No.: US 11,879,974 B2
(45) Date of Patent: Jan. 23, 2024

(54) SENSOR SYSTEM COMPRISING OPTOELECTRONIC DISTANCE SENSORS

(71) Applicant: SICK AG, Waldkirch (DE)

(72) Inventors: Heiko Steinkemper, Waldkirch (DE); Christoph Hofmann, Waldkirch (DE); Ulrich Druzella, Waldkirch (DE); Sanketh Ramachandra, Waldkirch (DE)

(73) Assignee: SICK AG, Waldkirch (DE)

( * ) Notice: Subject to any disclaimer, the term of this patent is extended or adjusted under 35 U.S.C. 154(b) by 1103 days.

(21) Appl. No.: 16/431,150

(22) Filed: Jun. 4, 2019

(65) Prior Publication Data

US 2019/0369249 A1 Dec. 5, 2019

(30) Foreign Application Priority Data

Jun. 5, 2018 (DE) .......................... 102018113359.6

(51) Int. Cl.
| | |
|---|---|
| *G01S 17/10* | (2020.01) |
| *G01S 7/486* | (2020.01) |
| *G01V 8/20* | (2006.01) |
| *B25J 9/16* | (2006.01) |

(52) U.S. Cl.
CPC .............. *G01S 17/10* (2013.01); *G01S 7/486* (2013.01); *G01V 8/20* (2013.01); *B25J 9/1674* (2013.01)

(58) Field of Classification Search
CPC ........... G01S 17/10; G01V 8/20; B25J 9/1674
See application file for complete search history.

(56) References Cited

U.S. PATENT DOCUMENTS

| 6,407,818 B1 * | 6/2002 | Whitehouse ........... G01B 11/00 356/627 |
|---|---|---|
| 2015/0300810 A1 * | 10/2015 | Fojtík ................ G01B 11/2408 356/635 |
| 2017/0030708 A1 | 2/2017 | Albert et al. |
| 2018/0131449 A1 * | 5/2018 | Kare ........................ G01S 17/06 |
| 2018/0143018 A1 * | 5/2018 | Kimura .................... G01C 3/08 |
| 2018/0147020 A1 * | 5/2018 | Strölin .................... F21V 21/40 |

FOREIGN PATENT DOCUMENTS

| DE | 102004041821 A1 | 3/2006 |
|---|---|---|
| DE | 102014012563 A1 | 2/2016 |
| DE | 102015112656 A1 | 2/2017 |
| DE | 102016103028 A1 | 8/2017 |
| DE | 102017105999 B3 | 3/2018 |
| DE | 202017100522 U1 | 6/2018 |

OTHER PUBLICATIONS

German Search Report dated Jan. 28, 2019 corresponding to application No. 102018113359.6.

* cited by examiner

*Primary Examiner* — Thanh Luu
(74) *Attorney, Agent, or Firm* — Nath, Goldberg & Meyer; Jerald L. Meyer

(57) ABSTRACT

A sensor system comprising optoelectronic distance sensors for monitoring a hazard zone at a movable machine part having at least one protected field, wherein the optoelectronic distance sensors are arranged in annular form in a first ring at the movable machine part, wherein a tool is arranged at the movable machine part, and wherein the optical axes of the distance sensors each have an acute angle tangentially to the annular shape or the distance sensors are rotatably arranged at the ring.

7 Claims, 9 Drawing Sheets

Fig.2.1
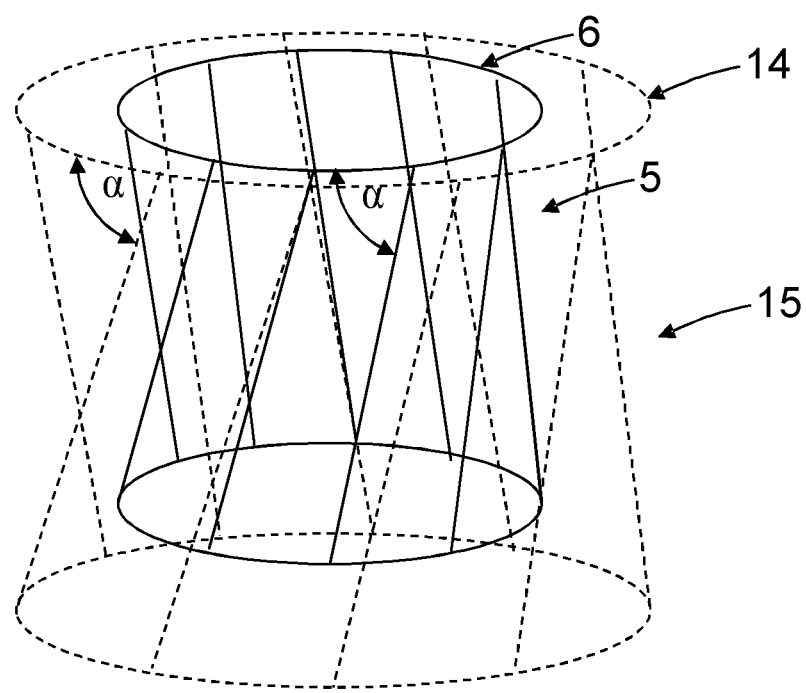

SENSOR SYSTEM COMPRISING OPTOELECTRONIC DISTANCE SENSORS

FIELD

The present invention relates to a sensor system comprising optoelectronic distance sensors.

BACKGROUND

DE 10 2015 112 656 A1 discloses a plurality of optoelectronic distance sensors at a movable machine part.

To implement a spatial and/or temporal close cooperation of a human and a robot, for example a human-robot collaboration, it is necessary to rethink the securing of robots or of movable machine parts. A first step is e.g. power-limited and force-limited robots. However, they can also not necessarily reduce the risk arising from an end effector installed at an end of an arm or from a workpiece transported by the robot to an acceptable residual minimal risk.

The sensor arrangement disclosed in DE 10 2015 112 656 A1 also has gaps between the protected fields of the individual sensors with a linear or areal formation of the protected fields. An object that is at one time located in one of these gaps will also not be detected in the course of a typically straight-line approach to the hazard site.

Furthermore in DE 10 2015 112 656 A1 only an adaptation of the protected field to the tool is protected, but not the loaded workpiece from which a danger can likewise arise in specific situations.

SUMMARY

It is an object of the invention to provide an improved protected field at a robot arm.

The object is satisfied by a sensor system comprising optoelectronic distance sensors for monitoring a hazard zone at a movable machine part having at least one protected field, wherein the optoelectronic distance sensors are arranged in annular form in a first ring at the movable machine part, and wherein a tool and/or a workpiece is/are arranged at the movable machine part, characterized in that the optical axes of the detection beams of the distance sensors each have an acute angle tangentially to the annular shape.

The object is further satisfied by a sensor system comprising optoelectronic distance sensors for monitoring a hazard zone at a movable machine part having at least one protected field, wherein the optoelectronic distance sensors are arranged in annular form in a first ring at the movable machine part, wherein a tool and/or a workpiece is/are arranged at the movable machine part, and wherein the distance sensors are rotatably arranged at the ring.

The sensor system serves for the safe monitoring of the hazard zone or of a monitored zone of the movable machine part.

In accordance with the present invention, safety is safety in the sense of machine safety. The standard EN/IEC 61496, for example, regulates the demands on a safe sensor or on safe electrosensitive protective equipment (ESPE) for securing hazardous zones. Machine safety is regulated in the standard EN 13849. The safety is, for example, ensured by a two-channel design or a design diverse in two channels of an evaluation unit for error localization and for a functional test. The distance measuring sensor or distance sensor in accordance with the present invention is designed, for example, as intrinsically safe and recognizes internal errors. An error signal is generated, for example, on discovery of an error. The sensor or distance sensor furthermore optionally has a sensor testing.

The evaluation unit recognizes protected field infringements and can output a safety related switch-off signal to stop a dangerous movement of the part or to brake the part. This can e.g. be implemented via safe switching signals, e.g. OSSD signals (output safety switching device signals) or safe distance data, spacing data or safe spatial data of the intrusion event. The evaluation unit has a two-channel design, for example.

The plurality of distance sensors are connected to an evaluation unit for evaluating the distance sensors.

The distance sensors are arranged spaced apart from one another along the ring, with the sensors forming an areal protected field that extends, for example, cylindrically or frustoconically or in the form of a rotational hyperboloid.

The distance sensors optionally have uniform spacings. An almost uniform resolution within the protected field is achieved by the uniform spacings of the sensors and a respective identical angular orientation of the detection beams.

The sensors are electrosensitive distance measuring sensors, with the sensors having a detection beam for detecting objects in the monitored zone. The detection beams or the optical axes of the distance sensors are each arranged respectively tangentially to the circular shape at an acute angle α.

The distance sensors can each have a linear or areal protected field. The areal protected field is formed in fan shape with a specific opening angle of, for example, 2° to 20°.

The monitoring takes place by a number of simple, one-dimensionally scanning distance measurement sensors while using the movement of the machine part and an alignment of the sensors in which the scanning direction is at an angle to the direction of movement of the part.

The inclined position of the optical axes of the distance sensors results in a dynamization of the protected field gaps or protected jacket gaps and thus enables a detection of objects that are present in these gaps on an approach of the machine part to an object.

Under the assumption that a movement of the protected field typically takes place in the direction of the center axis of the movable machine part or perpendicular to the plane of the ring, and not transversely to the protected field, the sensor system ensures that a defined object is at the latest detected after covering a specific distance of the movable machine part. This distance can, for example, be defined as a braking zone.

Due to the angle between the detection beam and the direction of movement, the scanning beam is displaced on an approach of a machine part relative to a static object in the monitored zone.

The acute angle α amounts, for example, to 30° to 85°, preferably 60° to 80°, particularly preferably 45°.

The angle here is dependent on the spacing of the optical axes of the detection beams or on the spacing of the distance sensors and on the length of the monitored zone. The spacing of the sensors is further dependent on the object size to be detected.

The angle of the sensors is optionally settable. The angle α can be dynamically varied, for example.

The distance sensors are time of flight sensors, for example. A time of flight sensor or a distance sensor or light scanner in accordance with the time of flight principle has at least one light transmitter which transmits consecutive light pulses into a measured zone and has at least one light receiver which receives the light pulses reflected at an object in the measured zone and supplies them in the form of received electrical signals to a control and evaluation unit which determines a distance signal representative of the distance of the object from the light sensor while taking account of the speed of light from the time between the transmission and reception of the light pulse.

An adaptation of the number of sensors is provided to generate a more or less closed protective jacket or protected field from the distance sensors. The number of sensors can be changed, for example. The more distance sensors are arranged, the closer the optical axes of the distance sensors are next to one another, whereby the protected field has a higher resolution.

The wavelength of the transmitted light of the distance sensors is preferably a wavelength invisible to the human eye, for example infrared light. A direct intrusion into possible protection gaps is thereby made more difficult since they are not visible.

In accordance with the second alternative of the invention, the sensors are rotatably arranged at the ring.

The rotation of the optical axes of the distance sensors results in a dynamization of the protected field gaps or protected jacket gaps and thus enables a detection of objects that are present in these gaps during the rotational movement.

The sensor system ensures that a defined object is at the latest detected after a specific time. This time depends on the rotational path or on the rotational speed.

In a further development of the invention, the optical axes of the distance sensors each have an identical acute angle with respect to a center axis of the movable machine part. A frustoconical protected field is thereby formed. The smaller the angle is, the more acute the truncated cone is formed. The protected field can thereby be adapted even more precisely to a tool or to a workpiece. The smaller the spacing between a workpiece/gripper and the background, the smaller the approach speed should be and thus also the enveloped protected volume.

In a further development of the invention, the optical axes of the distance sensors are aligned in star-shaped and in parallel with a plane of the ring. A planar annular protected field is thereby formed to recognize and avoid collisions on a movement in the direction of the plane of the ring.

In a further development of the invention, second optoelectronic distance sensors are arranged in annular form in a second ring at the movable machine part. A second protected field can thereby be generated that is, for example, arranged in front of the first protected field or that also forms a more complex protected field together with the first optoelectronic distance sensors. It is thus, for example, possible to form a double-frustoconical protected field.

In a further development of the invention, some of the optoelectronic distance sensors form a warning field. The other optoelectronic distance sensors form a protected field. A warning field can thereby be generated that is arranged, for example, in front of the first protected field.

In a further development of the invention, the sensors are rotatably arranged at the ring.

The rotation of the optical axes of the distance sensors results in a dynamization of the protected field gaps or protected jacket gaps and thus enables a detection of objects that are present in these gaps during the rotational movement.

The sensor system ensures that a defined object is at the latest detected after a specific time. This time depends on the rotational path or on the rotational speed.

In a further development of the invention, the optical axes of the optical distance sensors of the second ring have an obtuse angle tangentially to the annular shape.

The directions of the individual optical axes are thereby opposite or in opposite senses to one another depending on the circular arrangement. A more closely meshed or denser protected field can thereby be formed.

BRIEF DESCRIPTION OF THE DRAWINGS

The invention will also be explained in the following with respect to further advantages and features with reference to the enclosed drawing and to embodiments. The Figures of the drawing show in:

FIG. 2.1 a sensor system comprising a cylindrical protected field and a cylindrical warning field;

DETAILED DESCRIPTION

Figure 1:
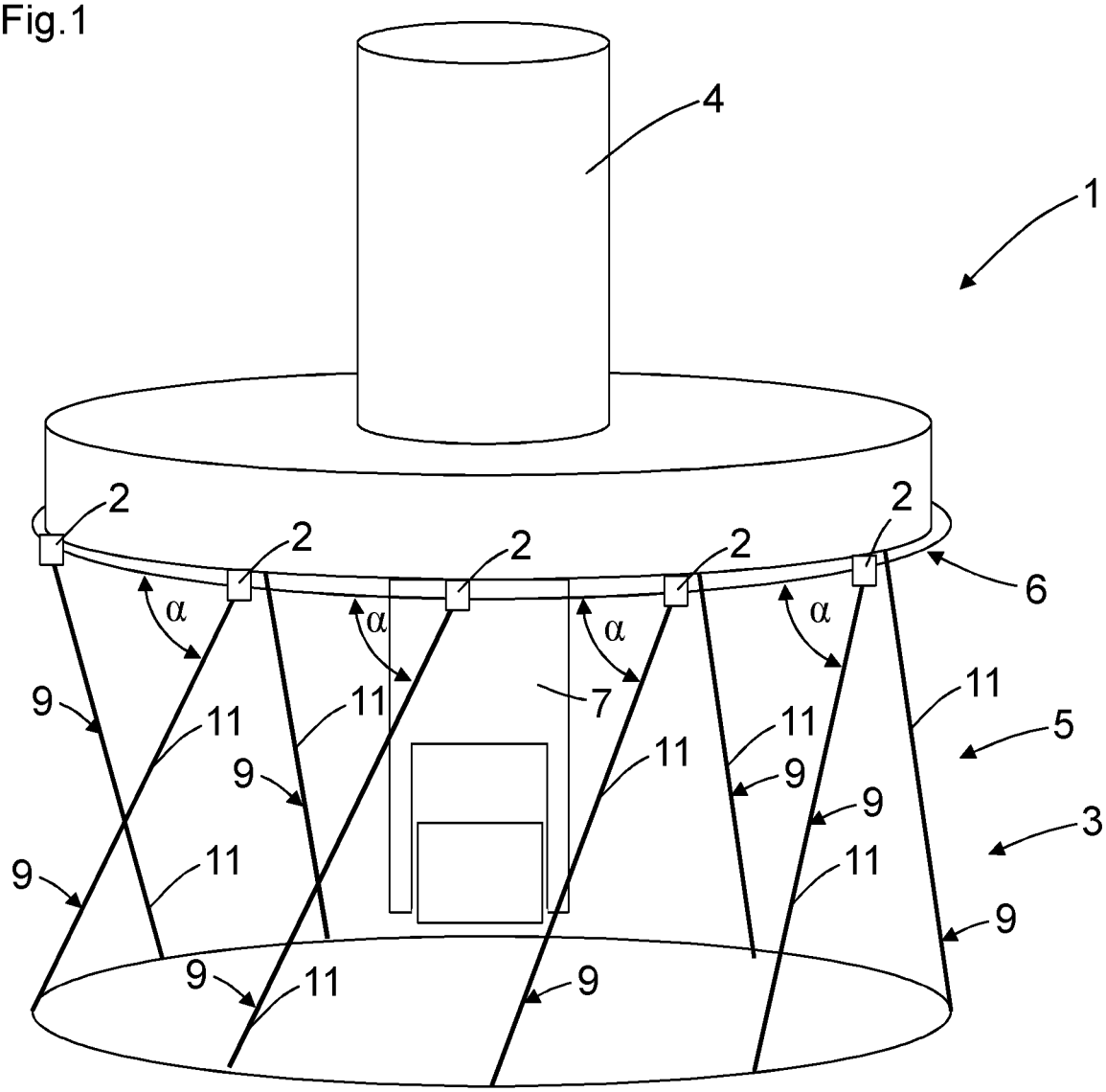
FIG. 1 a sensor system comprising optoelectronic distance sensors

In the following Figures, identical parts are provided with identical reference numerals.

FIG. 1 shows a sensor system 1 comprising optoelectronic distance sensors 2 for monitoring a hazard zone 3 at a movable machine part 4 having at least one protected field 5, wherein the optoelectronic distance sensors 2 are arranged in annular form in a first ring 6 at the movable machine part 4, and wherein a tool 7 is arranged at the movable machine part 4, characterized in that the optical axes 9 of the detection beams 11 of the distance sensors 2 each have an acute angle α tangentially to the annular shape.

The plurality of distance sensors 2 are connected to an evaluation unit for evaluating the distance sensors 2.

The evaluation unit recognizes protected field infringements and can output a safety related switch-off signal to stop a dangerous movement of the machine part 4 or to brake the machine part. This can e.g. be implemented via safe switching signals, e.g. OSSD signals (output safety switching device signals) or safe distance data, spacing data or safe spatial data of the intrusion event.

The distance sensors 2 are arranged spaced apart from one another along the ring 6, wherein the sensors 2 form an areal protected field 5 that extends cylindrically in accordance with FIG. 1, for example.

In accordance with FIG. 1, the distance sensors 2 have uniform spacings. An almost uniform resolution within the protected field 16 is achieved by the uniform spacings of the sensors 2 and a respective identical angular orientation of the detection beams 11.

The sensors 2 are electrosensitive distance measuring sensors 2, wherein the sensors 2 have a detection beam 11 for detecting objects in the monitored zone or in the hazard zone 3. The detection beams 11 or the optical axes 9 of the distance sensors are each arranged respectively tangentially to the annular shape at an acute angle α.

The monitoring takes place by a number of simple, one-dimensionally scanning distance sensors 2 while using the movement of the machine part and an alignment of the sensors 2 in which the scanning direction is at an angle to the direction of movement of the part.

The acute angle α amounts, for example, to 30° to 85°, preferably 60° to 80°, particularly preferably 45°

The angle here is dependent on the spacing of the optical axes 9 of the detection beams 11 or on the spacing of the distance sensors 2 and on the length of the monitored zone. The spacing of the sensors 2 is further dependent on the object size to be detected.

The angle α of the sensors 2 is optionally settable. The angle α can be dynamically varied, for example.

An adaptation of the number of sensors is provided to generate a more or less closed protective jacket or protected field 5 from the distance sensors 2. The number of sensors can be changed, for example. The more distance sensors 2 are arranged, the closer the optical axes of the distance sensors 2 are next to one another, whereby the protected field 5 has a higher resolution.

The wavelength of the transmitted light of the distance sensors 2 is preferably a wavelength invisible to the human eye, for example infrared light.

Figure 6:
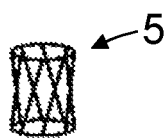
FIG. 6 and a cylindrical protected field.

FIG. 6 schematically shows the protected field 5 in accordance with FIG. 1.

Figure 7:
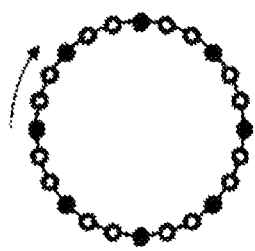
FIG. 7

FIG. 7 shows a cross-section approximately transversely to the optical axes on an approach of a flat object. A light spot of the detection beams 11 here migrates more or less dynamically in the ring and so changes its spatial position.

The inclined position of the optical axes of the distance sensors results in accordance with FIG. 7 in a dynamization of the protected field gaps or protected jacket gaps and thus enables a detection of objects that are present in these gaps on an approach of the machine part to an object.

Under the assumption that a movement of the protected field typically takes place in the direction of the center axis of the movable machine part or perpendicular to the plane of the ring, and not transversely to the protected field, the sensor system ensures that a defined object is at the latest detected after covering a specific distance of the movable machine part.

Due to the angle between the detection beam and the direction of movement, the scanning beam is displaced on an approach of a machine part relative to a static object in the hazard zone or monitored zone.

Figure 2:
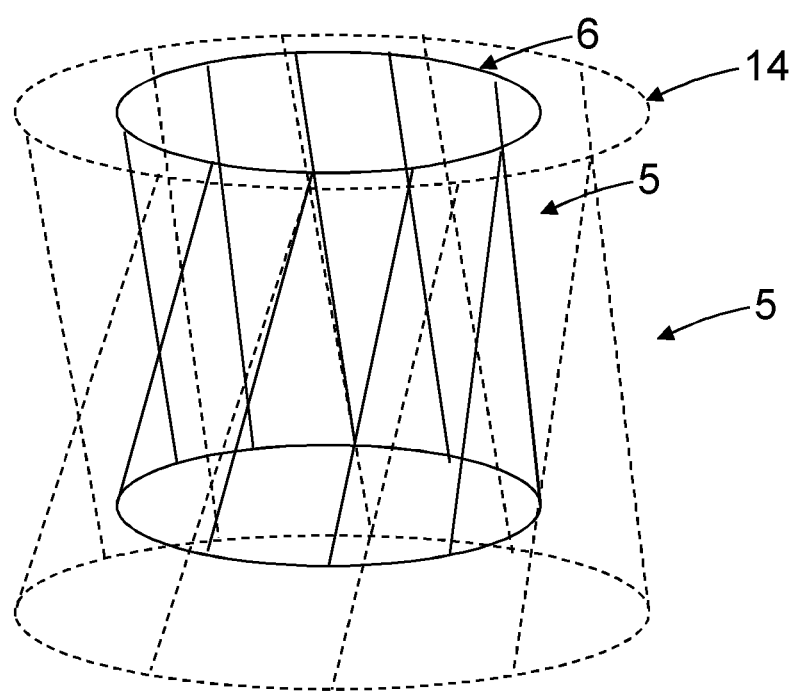
FIG. 2 a sensor system comprising a cylindrical protected field.

In accordance with FIG. 2, second or further optoelectronic distance sensors are arranged in annular form in a second ring 14 at the movable machine part. A second protected field 5 can thereby be generated that is, for example, arranged in front of the first protected field 5 or that also forms a more complex protected field 5 together with the first optoelectronic distance sensors. It is thus, for example, possible to form a double-cylindrical protected field 5.

In accordance with FIG. 2.1, some of the optoelectronic distance sensors form a warning field 15. The other optoelectronic distance sensors form a protected field 5. A warning field 15 can thereby be generated that is arranged, for example, in front of the first protected field.

Figure 3:
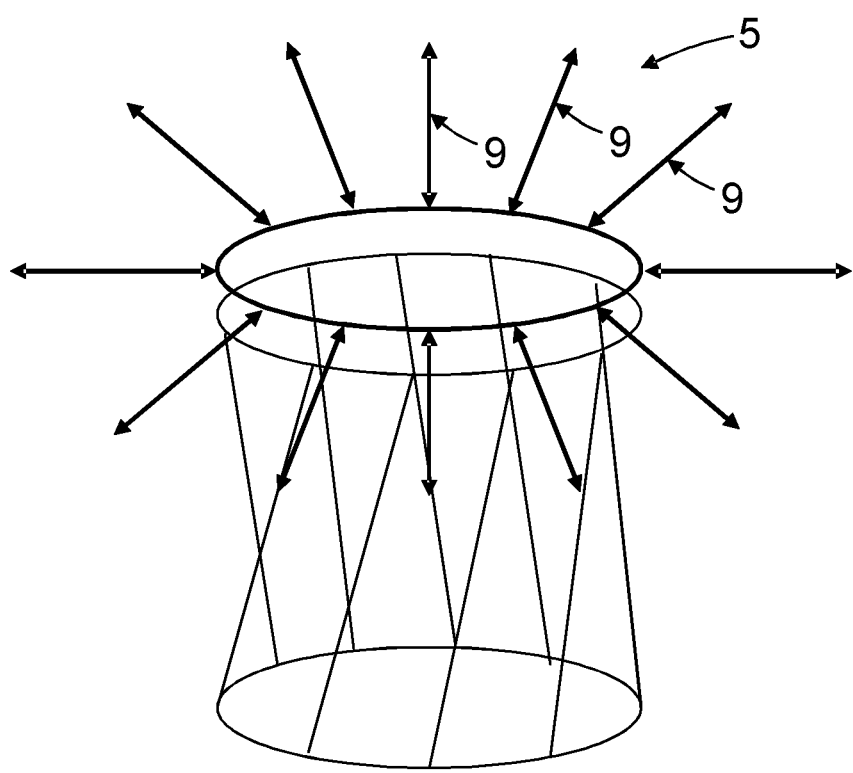
FIG. 3 a sensor system comprising an additional annular protected field and/or warning field.

In accordance with FIG. 3, additional optical axes 9 of the distance sensors are aligned in star shape and in parallel with a plane of the ring. A planar annular protected field 5 is thereby formed to recognize and avoid collisions on a movement in the direction of the plane of the ring.

Figure 4:
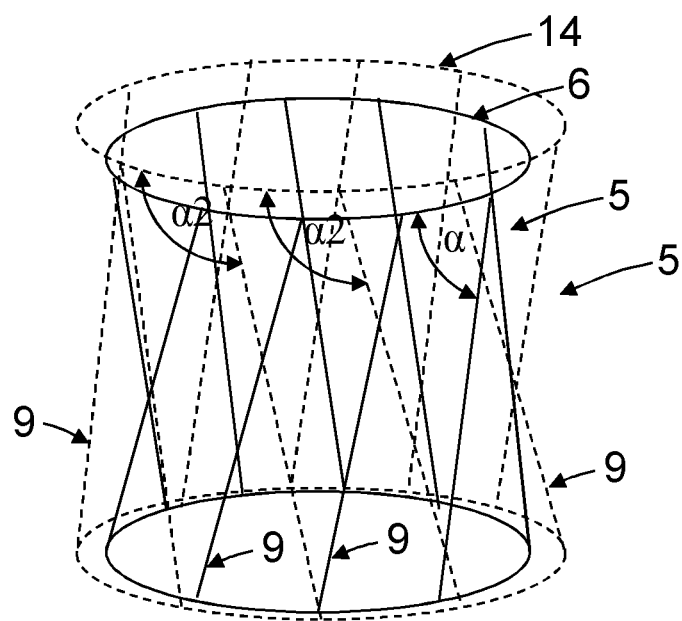
FIG. 4 a sensor system comprising a cylindrical protected field and/or a cylindrical warning field having detection beams in opposite senses.

In accordance with FIG. 4, second optoelectronic distance sensors are arranged in annular form in a second ring at the movable machine part. A second protected field 5 can thereby be generated that is, for example, arranged in front of the first protected field 5 or that also forms a more complex protected field together with the first optoelectronic distance sensors. It is thus, for example, possible to form a double-cylindrical protected field.

In accordance with FIG. 4, the optical axes of the optical distance sensors of the second ring 14 have an obtuse angle α2 tangentially to the annular shape.

The directions of the individual optical axes 9 are thereby opposite or in opposite senses to one another depending on the circular arrangement. A more closely meshed or denser protected field 5 can thereby be formed.

Figure 5:
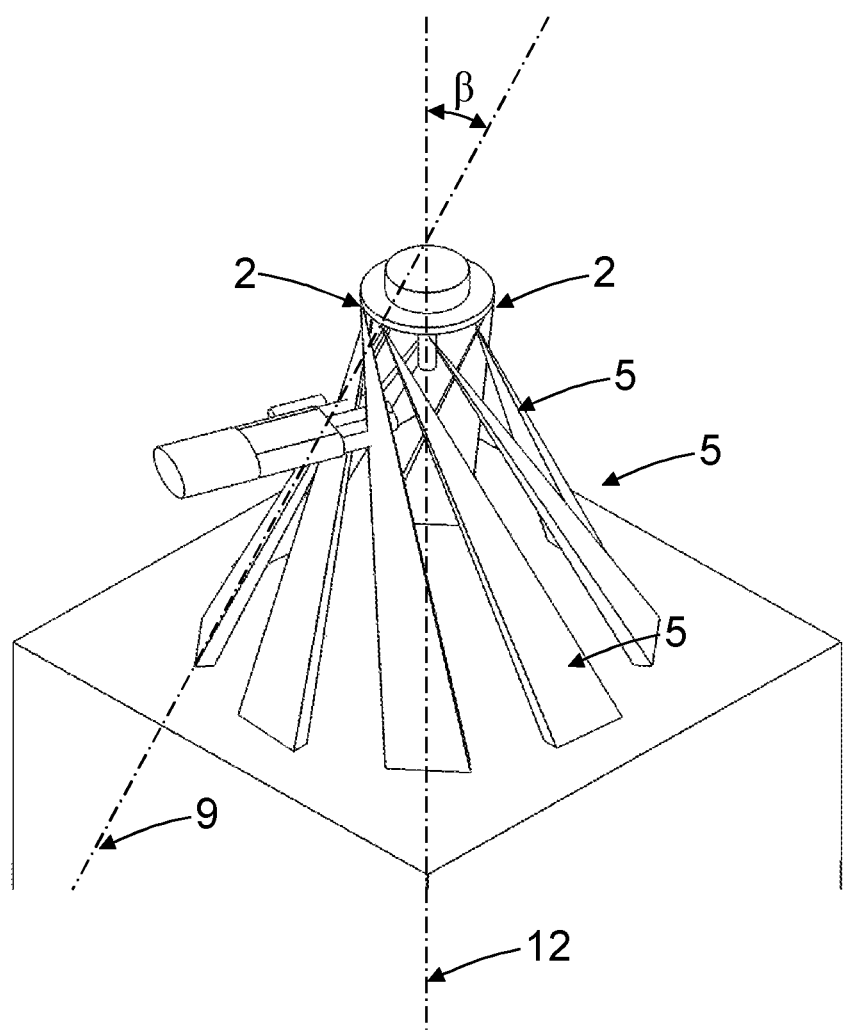
FIG. 5 a sensor system comprising a frustoconical protected field or a protected field in the form of a rotational hyperboloid.

In accordance with FIG. 5, the distance sensors 2 each have an areal protected field 5. The areal protected field 5 is formed in fan shape with a specific opening angle of, for example, 2° to 20°.

In accordance with FIG. 5, the optical axes 9 of the distance sensors additionally each have an identical acute angle β with respect to a center axis 12 of the movable machine part. A frustoconical protected field 5 is thereby formed. The smaller the angle is, the more acute the truncated cone is formed. The smaller the spacing between a workpiece/gripper and the background, the smaller the approach speed should be and thus also the enveloped protected volume.

Figure 8:
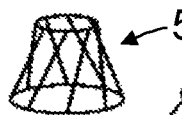
FIG. 8 and a frustoconical protected field or a protected field in the form FIG. 9 of a rotational hyperboloid.

FIG. 8 schematically shows the protected field 5 in accordance with FIG. 5.

Figure 9:
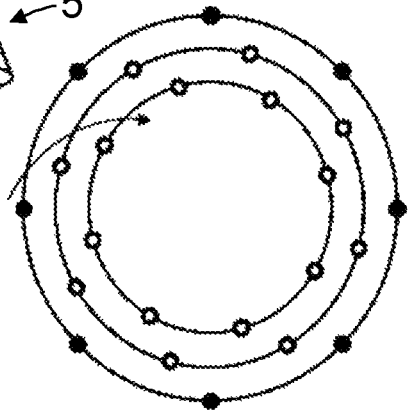

FIG. 9 shows a cross-section approximately transversely to the optical axes on an approach of a flat object. A light spot here migrates more or less dynamically in the ring and so changes its spatial position.

The inclined position of the optical axes of the distance sensors results in accordance with FIG. 9 in a dynamization of the protected field gaps or protected jacket gaps and thus enables a detection of objects that are present in these gaps at times on an approach of the machine part to an object.

Under the assumption that a movement of the protected field 5 typically takes place in the direction of the center axis of the movable machine part or perpendicular to the plane of the ring, and not transversely to the protected field, the sensor system ensures that a defined object is at the latest detected after covering a specific distance of the movable machine part.

Due to the angle between the detection beam and the direction of movement, the scanning beam is displaced on an approach of a machine part relative to a static object in the monitored zone.

Figure 10:
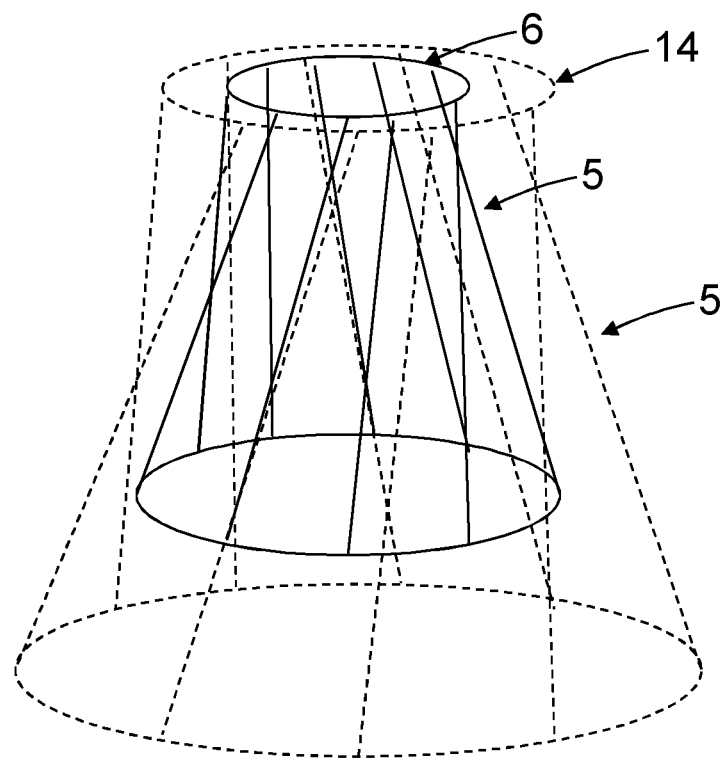
FIG. 10 a sensor system comprising a frustoconical protected field and/or a frustoconical warning field or a protected field in the form of a rotational hyperboloid.

In accordance with FIG. 10, second optoelectronic distance sensors are arranged in annular form in a second ring 14 at the movable machine part. A second protected field 5 can thereby be generated that is, for example, arranged in front of the first protected field or that also forms a more complex protected field 5 together with the first optoelectronic distance sensors. It is thus, for example, possible to form a double-frustoconical protected field 5.

Figure 11:
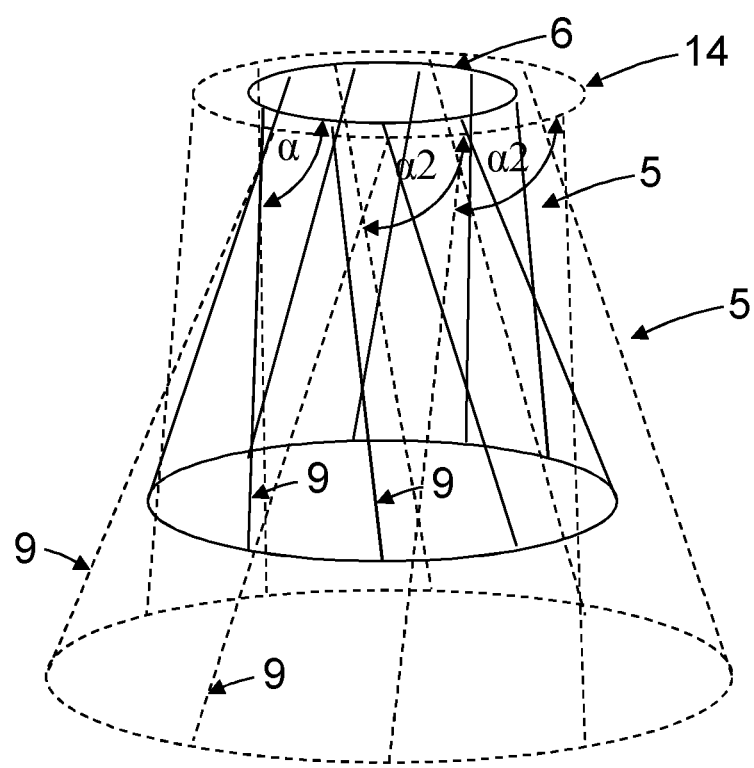
FIG. 11 a sensor system comprising a frustoconical protected field and/or a frustoconical warning field with detection beams in opposite senses or a protected field in the form of a rotational hyperboloid.

In accordance with FIG. 11, second optoelectronic distance sensors are arranged in annular form in a second ring 14 at the movable machine part. A second protected field 5 can thereby be generated that is, for example, arranged in front of the first protected field 5 or that also forms a more complex protected field 5 together with the first optoelectronic distance sensors. It is thus, for example, possible to form a double-cylindrical protected field 5.

In accordance with FIG. 11, the optical axes of the optical distance sensors of the second ring 14 have an obtuse angle α2 tangentially to the annular shape.

The directions of the individual optical axes 9 are thereby opposite or in opposite senses to one another depending on the annular arrangement. A more closely meshed or denser protected field 5 can thereby be formed.

In accordance with an embodiment that is not shown, the sensors are rotatably arranged at the ring.

The rotation of the optical axes of the distance sensors results in an additional dynamization of the protected field gaps or protected jacket gaps and thus enables a detection of objects that are present in these gaps during the rotational movement.

The sensor system ensures that a defined object is at the latest detected after a specific time. This time depends on the rotational path or on the rotational speed.

REFERENCE NUMERALS

1 sensor system
2 optoelectronic distance sensors
3 hazard zone
4 movable machine part
5 protected field
6 first ring
7 tool
9 optical axes
11 detection beams
12 center axis of the movable machine part
14 second ring
15 warning field
17 obtuse angle
α acute angle
β acute angle
α2 obtuse angle

The invention claimed is:

1. A sensor system comprising first optoelectronic distance sensors for monitoring a hazard zone at a movable machine part having at least one protected field,
wherein the first optoelectronic distance sensors are arranged in annular form in a first ring at the movable machine part,
wherein at least one of a tool and a workpiece is arranged at the movable machine part,
wherein optical axes of detection beams of the first optoelectronic distance sensors each extending at an acute angle from a tangent to the annular form,
wherein second optoelectronic distance sensors are arranged in annular form in a second ring at the movable machine part, wherein the first optoelectronic distance sensors have optical axes positioned at an acute angle with respect to a center axis of the movable machine part so that a frustoconical protected field is formed,
and wherein the first optoelectronic distance sensors have additional optical axes aligned radially outward from the first ring in parallel with a plane of the first ring.

2. The sensor system in accordance with claim 1, wherein the first optoelectronic distance sensors are rotatably arranged at the first ring.

3. The sensor system in accordance with claim 1, wherein the first and second optoelectronic distance sensors form at least one of a warning field and a protected field.

4. The sensor system in accordance with claim 1, wherein the optical axes of the second optoelectronic distance sensors of the second ring extend at an acute angle from a tangent to the annular form.

5. A sensor system comprising first optoelectronic distance sensors for monitoring a hazard zone at a movable machine part having at least one protected field,
wherein the first optoelectronic distance sensors are arranged in annular form in a first ring at the movable machine part,
wherein at least one of a tool and a workpiece is arranged at the movable machine part, wherein the first optoelectronic distance sensors are rotatably arranged at the first ring,
wherein the optical axes of the first optoelectronic distance sensors have an acute angle with respect to a center axis of the movable machine part so that a frustoconical protected field is formed,
wherein second optoelectronic distance sensors are arranged in annular form in a second ring at the movable machine part
wherein the optical axes of the second optoelectronic distance sensors of the second ring extending at an acute angle from a tangent to the annular form,
and additional optical axes of the first optoelectronic distance sensors aligned to extend radially outward from the first ring parallel with a plane of the first ring.

6. The sensor system in accordance with claim 5, wherein the first and second optoelectronic distance sensors form at least one of a warning field and a protected field.

7. A sensor system comprising first optoelectronic distance sensors for monitoring a hazard zone at a movable machine part having at least one protected field,
wherein the first optoelectronic distance sensors are arranged in annular form in a first ring at the movable machine part,
wherein at least one of a tool and a workpiece is arranged at the movable machine part, wherein the first optoelectronic distance sensors are rotatably arranged at the first ring,
wherein second optoelectronic distance sensors are arranged in an annular form in a second ring at the movable machine part,
wherein the first optoelectronic distance sensors have optical axes positioned at an acute angle with respect to a center axis of the movable machine part so that a frustoconical protected field is formed,
and additional optical axes of the first optoelectronic distance sensors aligned to extend radially outward from the first parallel with a plane of the first ring.

* * * * *